June 11, 1963 R. S. ZEBARTH 3,092,975
ARTICLE CHILLING METHOD AND APPARATUS
Filed July 21, 1958 4 Sheets-Sheet 1
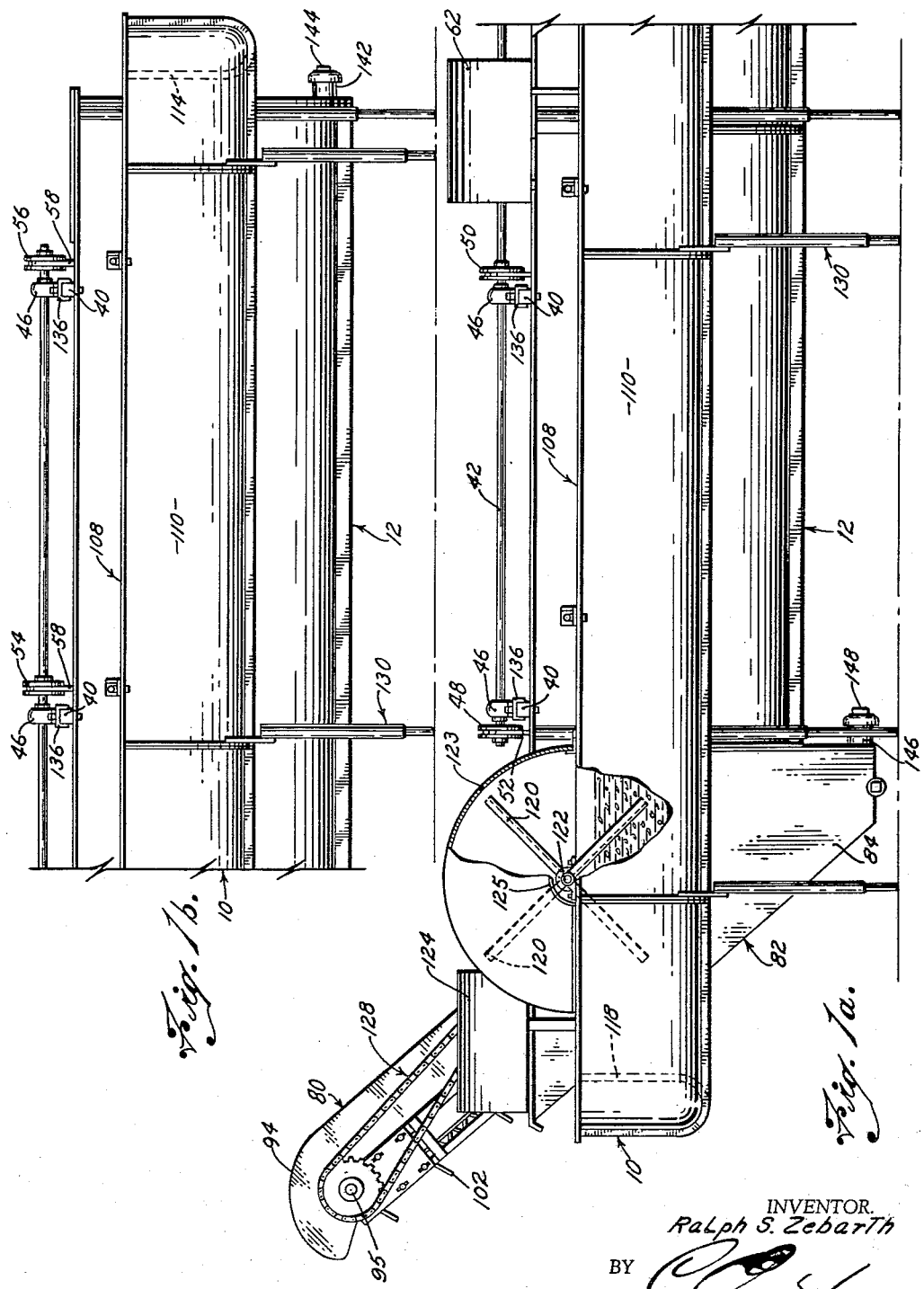
INVENTOR.
Ralph S. Zebarth
BY
ATTORNEY

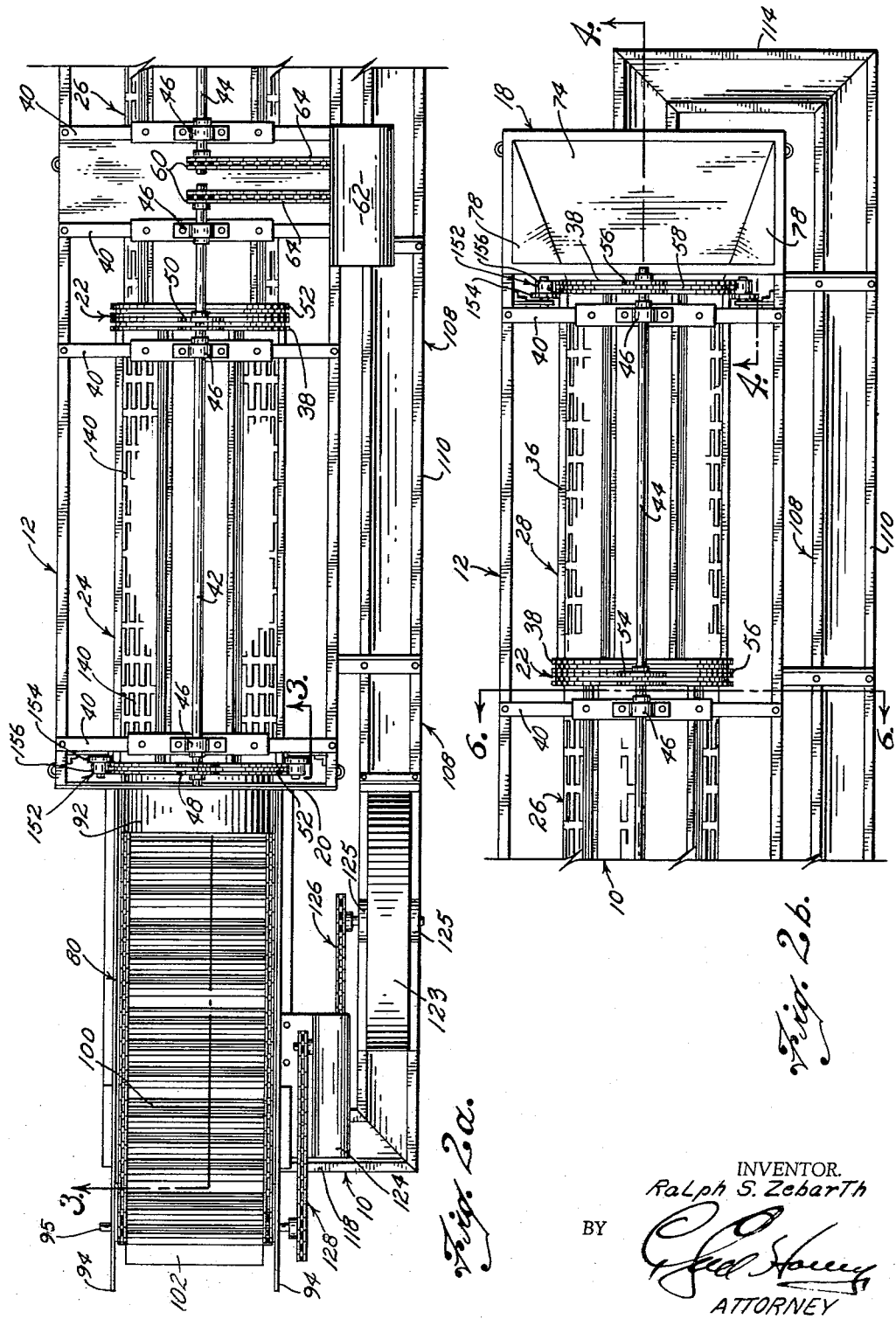

INVENTOR.
Ralph S. Zebarth
BY
ATTORNEY

INVENTOR.
Ralph S. Zebarth
BY
ATTORNEY

United States Patent Office 3,092,975
Patented June 11, 1963

3,092,975
ARTICLE CHILLING METHOD AND APPARATUS
Ralph S. Zebarth, Hickman Mills, Mo., assignor, by mesne assignments, to Gordon Johnson Company, Kansas City, Mo., a corporation of Missouri
Filed July 21, 1958, Ser. No. 749,804
13 Claims. (Cl. 62—63)

This invention relates to novel apparatus for rapidly cooling food products, as well as to a chilling method particularly adapted for continuous operation, thereby increasing the number of units which may be cooled in a predetermined period of time and lessening the cost of the chilling process.

Although the present apparatus and method may be utilized advantageously in the chilling of various types of articles and particularly those in the nature of food products, it has been found that the present equipment is especially useful in cooling poultry products to a predetermined temperature at a much faster rate and at a lower cost than heretofore. Poultry chilling operations in the past have involved dipping freshly killed birds having an initial body temperature of approximately 86° to 90° F. into a vat containing a liquid at a low temperature and subsequently, maintaining the poultry in such bath for a time sufficient to lower the temperature of the birds to a designated point. This operation was costly from both the standpoint of time and labor as well as the equipment necessary to carry out a large scale process, and the end result was that many processors resorted to packaging of the poultry products without proper prior chilling of the same or they were forced to utilize a large number of vats in conjunction with prohibitive quantities of ice cost-wise in order to obtain the necessary degree of cooling.

It is therefore the most important object of this invention to provide a method of inexpensively cooling food products and particularly poultry, by passing the articles to be chilled through novel apparatus forming a part of the invention in a continuous cyclic process whereby the use of dip tanks and similar equipment is completely obviated and maximum chilling is obtained in a minimum of time and with a limited amount of apparatus.

A further important object of this invention is to provide an improved method and apparatus for chilling food products and particularly poultry, wherein maximum thermal interchange between the articles and the liquid is assured throughout the period such poultry products are maintained in contacting relationship with the liquid coolant by virtue of the manner in which such products are passed through the liquid.

Also an important object of this invention is to provide an improved process and apparatus for chilling food products wherein the latter are continuously agitated and tumbled as the same are moved through the liquid, whereby the portion of the liquid coolant contacting the outer surfaces of each of the products being cooled is constantly changed to thereby assure continuous subjection of the articles to liquid coolant at a maximum temperature differential from the initial temperature of the products, and creating a rapid heat transfer at all times, resulting in a high efficiency level throughout operation of the apparatus.

Another important object of the invention relates to the provision of apparatus as referred to above wherein is provided elongated, tubular structure rotatably positioned within a receptacle receiving the liquid coolant, the tubular structure being adapted to receive the products and continuously agitate and tumble the same during advancement of the products through the liquid, to cause such products to be subjected to a maximum proportion of the water within the receptacle and thereby effecting lowering of the temperature of the products to approximately that of the liquid coolant.

Also an important object of this invention is to provide a novel process which may be utilized to cool products in the nature of freshly killed poultry from an initial high temperature to either a preselected intermediate temperature or to a relatively low temperature, without any modification of the apparatus for carrying out the operation and with equally good results.

An equally important object is to provide apparatus for rapidly chilling food products wherein is included means for recirculating the liquid coolant through the major, tubular structure-receiving receptacle of the equipment to thereby permit the liquid to be reused and which flowing liquid also serves to cause the products to be advanced through the tubular structure and thereby the liquid as the same are continuously agitated and tumbled.

Other important objects of this invention relate to the provision of an improved method for chilling poultry products wherein the degree of cooling thereof may be effectively controlled by closely correlating and regulating the speed of advancement of the products through the liquid, as well as the degree of agitation and tumbling thereof; to the provision of novel apparatus for chilling products such as poultry which is completely automatic in that products delivered to the apparatus are directed into the tumbling and agitation structure within the liquid-receiving receptacle by chute means and then subsequently, lifted from the liquid to a point above the level thereof by suitable conveyor means; to the provision of apparatus having means for rotating the agitation and tumbling structure within the liquid-receiving receptacle and including a number of horizontally spaced, vertically disposed belts rotatably suspending the structure within the liquid coolant whereby the interior of the tubular, product-receiving structure is maintained free of rotating shafts and supporting spider components which would impede progress of products through the structure; to the provision of tubular structure within the liquid receptacle for agitating and tumbling the food products and having a side wall that is perforated for free flow of liquid coolant therethrough, without causing tearing or other deleterious effects on the surfaces of the products; to the provision of such tubular structure as described having a number of circumferentially spaced, longitudinally extending, inwardly and outwardly projecting vanes for agitating the liquid and thereby causing a constant flow of liquid of lowest temperature across the surfaces of the products passing through the apparatus; to apparatus wherein a portion of the liquid coolant may be continuously withdrawn from the receptacle while fresh liquid is introduced into the same, to assure maintenance of sanitary conditions even under continuous operation; to a novel process wherein flexing of poultry products passed through the apparatus during agitation and tumbling of the same results in products having greater tenderness upon cooking; and to other important objects and salient features of the instant invention which will become obvious or be described more fully hereinafter.

In the drawings:

FIGURES 1a and 1b are segmental, side elevational views of apparatus embodying the concepts of the instant invention and which may be utilized to practice the improved process hereof, certain parts being broken away and in section to reveal details of construction;

FIGS. 2a and 2b are segmental plan views of the apparatus illustrated in FIGS. 1a and 1b;

FIG. 3 is a fragmentary, cross-sectional view taken substantially on the irregular line 3—3 of FIG. 2a;

Briefly, the method of the instant invention contemplates passing articles to be cooled in the nature of poultry or similar products along a preselected path through a liquid coolant at a temperature below the initial temperature of the products while the latter are continuously agitated and tumbled to assure subjection of the products to maximum quantities of liquid at the greatest temperature differential. Movement of the products through the liquid is effected by flow of the coolant itself and the products are normally maintained within the liquid for a time sufficient to cool the products to approximately the predetermined low temperature of the liquid coolant, and the rate of advancement of the products is closely correlated with the degree of agitation and tumbling of the poultry to rapidly cool it to approximately the temperature of the coolant within the length of the preselected path.

The novel apparatus provided for carrying out the process outlined above includes a receptacle adapted to contain a quantity of liquid coolant and receiving rotatable, tubular structure suspended substantially within the liquid and adapted to continuously agitate and tumble products introduced into the apparatus while the same are advanced through the liquid. The product-receiving tubular structure is foraminous in character to permit the liquid coolant to pass freely through the wall thereof and is provided with vane means for agitating the liquid within the receptacle as the structure is rotated. Recirculation means is provided for causing the liquid within the receptacle to flow in one direction, which thereby serves as power means for effecting advancement of the products through the tubular structure. Since the flow rate of the liquid through the receptacle containing the tubular structure as well as the rate of rotation of such tubular structure can be regulated, the degree of cooling of the food products can be changed as desired, as the flow rate and rotation coefficient parameters are varied.

Figure 3:
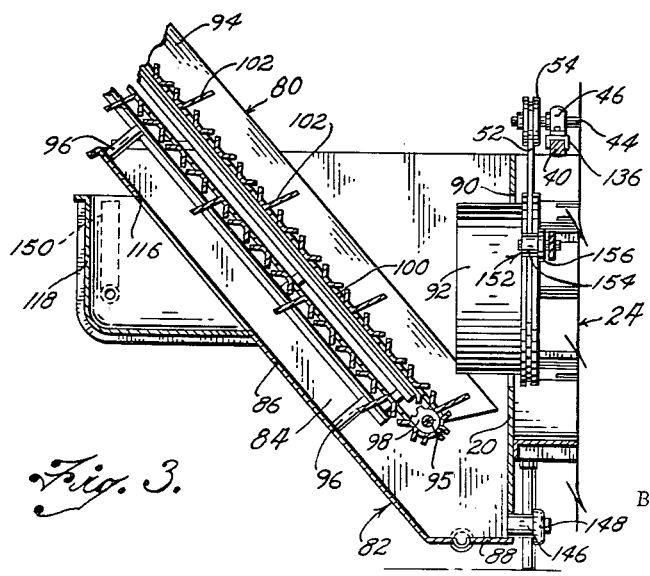

Apparatus for carrying out the present process is illustrated in the drawings in its preferred form and designated generally by the numeral 10. Apparatus 10 includes an elongated, liquid coolant-receiving receptacle 12 having opposed, upright, parallel side portions 14 (FIG. 6) interconnected by an intermediate, semicylindrical bottom segment 16 integral with the longitudinally extending lowermost margins of portions 14. An end wall 18 (FIG. 4) and an end wall 20 (FIG. 3) are provided for recetpcale 12 in closing relationship thereto.

Means for continuously agitating and tumbling food products as the same are advanced through apparatus 10 includes tubular structure broadly designated 22 and consisting of a number of releasably interconnected, tubular sections, 24, 26 and 28. As most clearly shown in FIGS. 2a, 2b and 6, sections 24, 26 and 28 are adapted to be disposed within receptacle 12 for rotation on a common horizontal axis and in this connection, it is to be noted that receptacle 12 is of sufficient length to accommodate all of the sections 24, 26 and 28 when the same are releasably interconnected.

Figure 8:
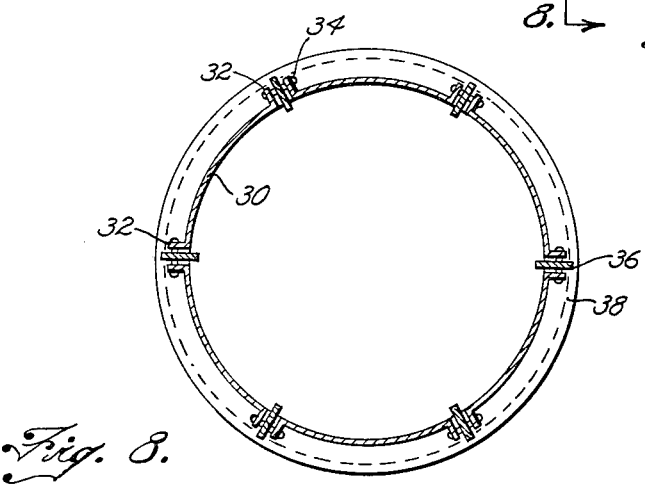
FIG. 8 is a vertical, cross-sectional view taken on the line 8—8 of FIG. 7 still further enlarged.

Sections 24, 26 and 28 are substantially identical in construction, although section 28 may be slightly larger in diameter if desired. Each of the sections 24, 26 and 28 includes a number of interengageable, releasably interconnected, perforate segments 30, each provided with outwardly projecting, longitudinally extending ribs 32 on opposed longitudinal margins thereof and having a number of aligned, spaced openings (not shown) therein, adapted to receive bolt means broadly designated 34. As most clearly shown in FIG. 8, relatively narrow, elongated vanes 36 are positioned between each pair of opposed, proximal ribs 32 of segments 30 with respective bolt means 34 extending through aligned perforations (not shown) in vanes 36. Vanes 36 are preferably disposed in a manner so that one longitudinal margin thereof projects outwardly from the outer extremities of ribs 32, while the opposed longitudinal edges of vanes 36 extend inwardly into the interior of a respective tubular section 24, 26 or 28 a predetermined distance. It can be recognized that sections 24, 26 and 28 may be readily disassembled by merely removing corresponding bolt means 34 for replacement of segments 30 or vanes 36.

Figure 7:
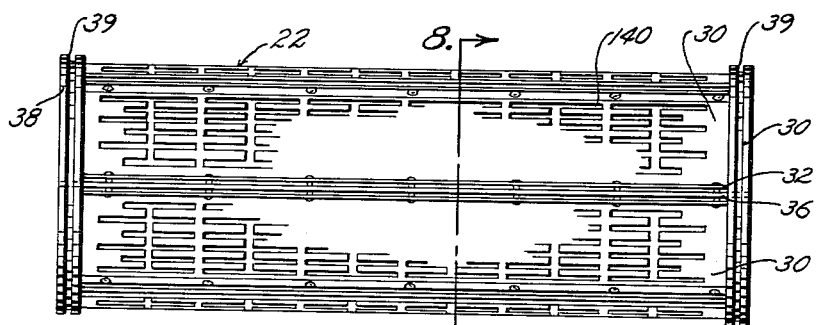
FIG. 7 is a side elevational view of one section of the tubular structure normally suspended within the liquid-receiving receptacle of the present apparatus, the section being enlarged to illustrate details of construction.

Each tubular section 24, 26 and 28 has an annular member 38 suitably secured to the same at opposed ends of the sections and, as most clearly illustrated in FIG. 7, each annular member 38 is provided with a circumferentially extending, outwardly facing groove 39 adapted to receive a V-belt or the like in a manner to be more specifically defined hereinafter. In assembling tubular sections 24, 26 and 28 to present tubular structure 22, members 38 are brought into abutting relationship and bolt means or the like (not shown) utilized to releasably interconnect respective sections 24, 26 and 28.

A plurality of parallel, horizontal support brackets 40 bridging the distance between the uppermost extremities of opposed portions 14 of receptacle 12 and secured thereto serve as means for rotatably supporting a pair of shafts 42 and 44. As most clearly illustrated in FIGS. 2a and 2b, a pair of horizontal brackets 40 are disposed in proximal overlying relationship to tubular section 24 and by the same token, another pair of support brackets 40 are positioned in overlying relationship to the tubular section 28. A third pair of support brackets 40 located substantially intermediate the ends of tubular section 26 complete the support means for shafts 42 and 44, it being noted that the brackets 40 mounting shaft 42 are provided with respective bearing structure 46 rotatably receiving shaft 42, while the brackets 40 supporting shaft 44 are likewise provided with bearing structure 46 rotatably receiving shaft 44. Of particular importance is the fact that shafts 42 and 44 are in end-to-end, coplanar relationship and disposed for rotation about horizontal axes.

Pulleys 48 and 50 secured to shaft 42 in overlying relationship to opposed, annular members 38 of tubular section 24 each have a vertically disposed V-belt 52 trained thereover and received within corresponding grooves 39 of respective annular members 38 of tubular section 24, whereby the end of tubular structure 22 adjacent end wall 20 is suspended from pulleys 48 and 50. By the same token, pulleys 54 and 56 secured to shaft 44 in overlying relationship to the annular member 38 of tubular section 26 proximal to section 28 and the annular member 38 of section 28 remote from section 26 have respective V-belts 58 trained thereover and rotatably receiving the annular members 38 of tubular sections 26 and 28 referred to above. In this manner, the end of tubular structure 22 adjacent end wall 18 is suspended from pulleys 54 and 56 mounted on shaft 44.

Sprocket wheels 60 (FIG. 22) secured to adjacent ends of shafts 42 and 44 in overlying relationship to tubular section 26 are operably coupled to a prime mover and gear box unit 62 through provision of respective endless link chains 64. It can be appreciated that the gear box within unit 62 is constructed so that shafts 42 and 44 are rotated in one direction by the prime mover.

Figure 5:
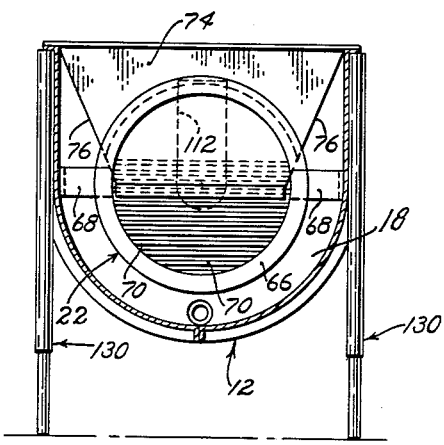
FIG. 5 is a vertical, cross-sectional view taken on the line 5—5 of FIG. 4 and looking in the direction of the arrows.
Figure 4:
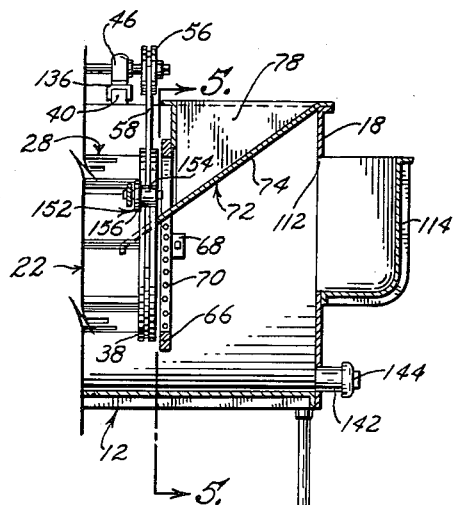
FIG. 4 is a fragmentary, cross-sectional view taken on irregular line 4—4 of FIG. 26.

An annular ring 66 (FIGS. 4 and 5) secured within receptacle 12 by a pair of oppositely extending bracket arms 68 suitably joined to portions 14 of receptacle 12, positioned adjacent end wall 18 and concentric with the proximal annular member 38 of tubular section 28, has a series of vertically spaced, parallel, horizontal bars 70 joined to the inner peripheral edge thereof to prevent products directed into tubular structure 22 from passing out of the end thereof proximal to end wall 18. A chute broadly designated 72 is provided at the end of receptacle 12 adjacent end wall 18 for directing products to be chilled into the open end of tubular structure 22 and, as indicated in FIGS. 4 and 5, chute 72 has a downwardly inclined bottom 74 secured at the outermost end thereof to the upper extremity of end wall 18 and extending downwardly and inwardly within receptacle 12 through annular ring 16 and into the interior of tubular structure 22. Opposed side margins 76 of bottom 74 converge as annular ring 66 is approached, and downwardly and inwardly converging sides 78 of chute 72 interconnecting side margins 76 of bottom 74 with the upper edges of proximal portions 14 serve to assure direction of the products to be cooled into the open end of tubular structure 22. It is to be noted that bottom 74 of chute 72 slants downwardly at an angle such that the same passes through annular plate 66 in close proximity to the uppermost bar 70 secured within annular plate 66 to preclude passage of products beneath bottom 74 into the part of receptacle 12 adjacent end wall 18.

Means for removing products from the liquid coolant contained in receptacle 12 includes conveyor mechanism broadly numerated 80 (FIGS. 1a and 3) and partially housed within an open top compartment 82 joined to the face of end wall 20 away from receptacle 12. Compartment 82 is substantially triangular in section along a plane parallel with the longitudinal length of receptacle 12 and includes a pair of opposed, polygonal sides 84 joined at one margin thereof to the outer, upright extremities of end wall 20 and provided with an inclined front wall 86 connected to sides 84 and with end wall 20 through a relatively short, horizontal, bottom plate 88. At this point it is important to note that end wall 20 is provided with a circular opening 90 concentric with tubular structure 22 when the same is mounted within receptacle 12, and a cylindrical collar 92 is suitably joined to the annular member 38 of tubular section 24 adjacent end wall 20 and extends through opening 90 into the interior of compartment 82. Conveyor mechanism 80 comprises a pair of parallel mounting plates 94 having support members 96 connected thereto and maintaining the same in substantially parallel relationship with the major plane of front wall 86, it being noted that plates 94 serve as means for rotatably mounting a pair of normally horizontal, vertically spaced shafts 95 in turn having rollers 98 thereon receiving an endless conveyor belt 100. Transversely extending, substantially J-shaped flights 102 secured to the normally outwardly extending face of conveyor belt 100 are disposed to receive products emanating from collar 92 to lift such products out of the liquid coolant 104 normally contained in receptacle 12 and compartment 82 to a preselected point above the level 106 of such coolant. It is to be noted that for cleaning purposes, conveyor mechanism 80 is preferably constructed so that the same may be shifted upwardly along the inner face of front wall 86 to a point where mechanism 80 may be tilted downwardly over the uppermost edge of front wall 86 to an accessible position.

Figure 6:
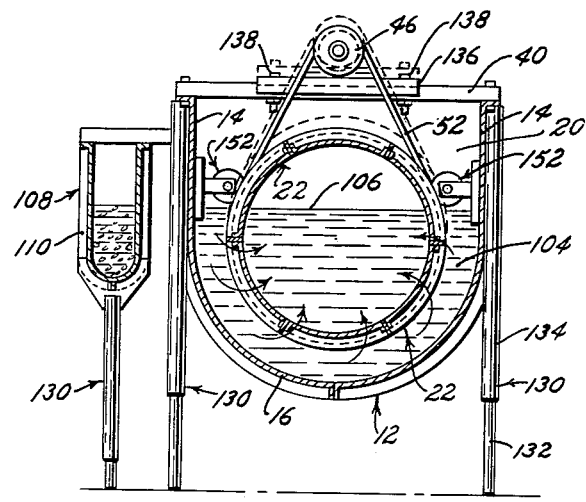
FIG. 6 is a vertical, cross-sectional view taken on the line 6—6 of FIG. 2b.

A horizontal, substantially U-shaped, open top conduit broadly numerated 108 is joined to receptacle 12 and compartment 82 for recirculating liquid coolant 104 within apparatus 10. As illustrated in FIGS. 2a and 2b, conduit 108 has a central portion 110 extending beyond end wall 18 of receptacle 12 a slight distance and in the opposite direction to a point proximal to the outer edge of front wall 86 of compartment 82. End wall 18 has a polygonal opening 112 (FIG. 4) therein placing the interior of receptacle 12 in communication with open top lateral 114 coupled with central portion 110 and forming a part of conduit 108. By the same token, front wall 86 has a polygonal opening 116 (FIG. 3) intercommunicating the interior of compartment 82 with central portion 110 of open top conduit 108 by a lateral 118. As illustrated in FIGS. 1a, 1b and 6, conduit 108 is disposed substantially intermediate the upper and lower extremities of receptacle 12 and is adapted to convey the liquid coolant 104 from end 20 of receptacle 12 back to the end 18 thereof. Means for causing the liquid coolant 104 to flow in conduit 108 in a direction toward end wall 18 of receptacle 12 comprises a number of radially extending paddles 120 joined to a horizontal shaft 122 carried by opposed bearing means 125 mounted on corresponding upper edges of conduit 108, prime mover 124 mounted on the upper part of compartment 82 being operably connected to shaft 122 through chain and sprocket wheel means 126 (FIG. 2a) whereby upon operation of prime mover 124, shaft 122 and thereby paddles 120 are caused to be moved in a counterclockwise direction to force the liquid coolant 104 contained in central portion 110 of conduit 108 toward end wall 18 of receptacle 12. A semicircular hood 123 is disposed over paddles 120 and shaft 122 in protecting relationship thereto, hood 123 being swingably carried by and overlying a segment of central portion 110 of conduit 108. Prime mover 124 is also coupled with shaft uppermost 95 through endless chain and sprocket wheel means 128 to thereby effect movement of conveyor belt 100 and the flights 102 thereon in conjunction with movement of shaft 122 and paddles 120 attached thereto. Gear means (not shown) is preferably operably coupled with prime mover 124 to permit selective interengagement of conveyor mechanism 80 and shaft 122 with prime mover 124 and also, to vary the speed of rotation of the components.

Although a plurality of upright leg means 130, each comprising a pair of relatively telescoped components 132 and 134, have been shown as preferred for supporting receptacle 12, compartment 82 and conduit 108 in a predetermined elevation from the ground, it can be ascertained that any suitable construction may be utilized to maintain apparatus 10 at a selected height. However, leg means 130 are of particular advantage because it is possible to vary the relative length thereof by adjusting the relative positions of respective components 132 and 134 and permitting apparatus 10 to be properly leveled substantially irrespective of the irregularity of the surface upon which the same is positioned. Another important adjustable feature of apparatus 10 is the provision of substantially U-shaped channels 136 (FIGS. 3 and 4) adjustably mounted on corresponding brackets 40 and carrying respective bearing structures 46. Vertical bolts 138 (FIG. 6) extending through channels 136 into support brackets 40 permit the relative elevation of channels 136 with respect to brackets 40 to be varied at will, thereby changing the position of tubular structure 22 relative to receptacle 12.

As related hereinabove, each of the semicylindrical segments 30 forming a part of sections 24, 26 and 28 have a network of perforations 140 therein permitting substantially free flow of liquid 104 into the interior of tubular structure 22.

In order to permit liquid coolant 104 to be drained from receptacle 12, an outlet conduit 142 (FIG. 4) is disposed in end wall 18 adjacent the bottom thereof and communicating with the interior of receptacle 12, with a removable plug 144 being provided therein to permit flow of liquid coolant 104 through outlet conduit 142 to be selectively controlled. Another outlet pipe 146 (FIG. 3) normally closed with a plug 148 is connected to wall 20 and communicates with the interior of compartment 82 to permit the latter to be drained as desired. An L-shaped overflow pipe 150 (FIG. 3) communicating with lateral 118 of open top conduit 108 serves to maintain the liquid 104 at a predetermined level within conduit 108 and thereby, receptacle 12 and compartment 82.

A pair of roller guide assemblies broadly numerated 152 (FIG. 6) are provided at each end of tubular structure 22 for restricting lateral and longitudinal movement of the same during rotation thereof. As best seen in FIGS. 2a, 2b and 6, assemblies 152 are mounted on the inner face of receptacle 12 in opposed relationship at corresponding ends of the latter. Each assembly 152 includes a roller 154 engaging the peripheral edge of a respective annular member 38, as well as an outer wheel 156 integral with each roller 154, substantially larger in diameter than the latter, and disposed in abutting relationship to the outer ends of respective sections 24 and 28. It can be ascertained that rollers 154 prevent structure 22 from moving laterally and wheels 156 preclude longitudinal movement thereof during rotation of the same.

In operation, it is to be understood that liquid 104 at a predetermined low temperature is directed into receptacle 12, compartment 82 and open top conduit 108, whereupon the prime mover in unit 62 and prime mover 124 are actuated to in turn rotate tubular structure 22 about its longitudinal axis in conjunction with operation of conveyor mechanism 80. The gear box within the unit 62 causes link chains 64 to be rotated in the same direction to thereby rotate shafts 42 and 44 about their longitudinal axes. Rotation of pulleys 48, 50, 54 and 56 in turn moves V-belts 52 and 58, effecting rotation of interconnected tubular sections 24, 26 and 28. It can also be perceived that actuation of prime mover 124 causes chain and sprocket wheel means 128 to rotate shafts 95 and thereby moving conveyor belt 100 in a counterclockwise direction, viewing FIG. 3, to thereby remove articles discharged from tubular structure 22 from liquid 104 and lift the same to a predetermined point.

Prime mover 124 also rotates shaft 122 and the paddles 120 thereon in a counterclockwise direction through chain and sprocket wheel means 126 to force liquid coolant 104 contained in conduit 108 to be moved rearwardly therein toward end wall 18 of receptacle 12. In this manner, the liquid 104 is caused to flow through receptacle 12 and compartment 82 in a direction from opening 112 in end wall 18 toward opening 114 in front wall 86 of compartment 82.

It is contemplated that the temperature of liquid coolant 104 be at a point somewhat below that of the initial temperature of the products to be cooled by apparatus 10 and, inasmuch as the latter is particularly adapted for chilling of poultry and the like, liquid coolant 104 should preferably be at a temperature substantially below 86° to 90° F., the normal initial temperature of freshly killed poultry. Although the temperature of coolant 104 may be at any preselected point, it has been found that by utilizing tap water only, at approximately 50° F., the poultry directed into apparatus 10 may be rapidly chilled to approximately this low temperature as the birds are passed through receptacle 12, so long as the liquid is maintained at substantially the 50° F. level. It is to be pointed out at this juncture that the liquid 104 within apparatus 10 may be maintained at the predetermined temperature referred to above by directing fresh liquid at the proper temperature into apparatus 10 at a predetermined flow rate, dependent upon the temperature differential between the products to be cooled and that of the liquid and also, the number of articles or poultry directed into apparatus 10 per unit of time. The excess liquid overflows from conduit 108 through the uppermost end of pipe 150 to thereby maintain level 106 of liquid 104 at the desired point.

However, if it is desired to lower the temperature of the poultry or other food products below that of the tap water, crushed ice may be introduced into liquid 104 (as shown, for example, in FIGS. 1a and 6) to maintain the same at approximately 32° F. Although it is possible to chill poultry from its initial body temperature to approximately 32° F. by merely passing the same through apparatus 10, it has been found that best results are obtained by providing a pair of chilling units 10, one of which contains tap water and in which the temperature of the birds is lowered to approximately 50° F., while the other chilling unit contains water having crushed ice therein to lower the temperature of the poultry to the final low level. In this connection, it can be appreciated that the temperature to which it is desired that the poultry be lowered will be determined by the final use to which the products are to be placed. For example, if the poultry is to be immediately cooked for partially pre-cooked packages and similar products, it is not necessary to chill the poultry to the low level temperature but tap water at approximately 50° F. has been found to be entirely adequate. However, if the birds are to be quick-frozen or distributed in a fresh condition through normal trade channels, it is desirable that the birds be cooled to approximately 36° to 38° F. This latter low level temperature is preferably accomplished by utilization of two chilling units in the manner set forth above.

The poultry or other food products to be cooled are initially directed into apparatus 10 via chute 72, the articles sliding down bottom 74 directly into the adjacent open end of tubular section 28. It can be seen that because of the way in which bottom 74 extends into the proximal end of tubular section 28, delivery of the products into tubular structure 22 is assured and spaced, horizontal bars 70 serve to prevent the products from passing out of tubular section 28 into receptacle 12 between annular ring 66 and end wall 18. After the products enter tubular section 28, it can be perceived that because of the rotational movement of tubular structure 22, the poultry or other products are agitated and tumbled within respective sections 24, 26 and 28 which thereby subject the poultry to maximum quantities of liquid 104 and assure rapid heat transfer between the liquid coolant and the products.

The provision of laterally extending vanes 36 on tubular sections 24, 26 and 28 is an especially important feature of apparatus 10 because the vanes serve to force liquid 104 into structure 22 through perforations 140 and thereby not only effecting rapid recirculation of liquid 104 through each of the sections 24, 26 and 28 but also subjecting the poultry to maximum quantities of coolant liquid during the period such products are passing through apparatus 10 by virtue of the agitation of the liquid and the products themselves.

The liquid 104 flowing in receptacle 12 from end wall 18 to wall 20 thereof causes the poultry or other products to be moved forwardly in tubular structure 22 from chute 72 toward collar 92 at the opposite end thereof and thus, the products are forced to describe a somewhat spiral path through receptacle 12, thereby materially increasing the rate of chilling and furthermore, improving the product itself when poultry is passed through apparatus 10. It has been ascertained that because of the flexing and kneading of the poultry by virtue of the constant agitation of liquid 104 and tumbling of the poultry by tubular structure 22, the tenderness of the meat of the birds is increased and a more desirable product is produced. The reason for this increased tenderness is not understood completely, but it is believed to be attributable to kneading and flexing of the birds in conjunction with subjection of the same to the liquid coolant 104 somewhat similar to the massaging action encountered in whirlpool physiotherapy machines. Although many liquids could be utilized for the chilling operation, it is particularly contemplated that water be employed because of the relatively inexpensive nature of the same and the fact that there is no contamination of the products being chilled.

The continuous agitation and tumbling of the products as the same are directed through tubular structure 22 also serves the function of thoroughly cleansing the poultry and substantially removing all coagulated blood and other materials which would otherwise tend to give the final product an unsightly appearance. The liquid 104 contained within apparatus 10 is maintained in a substantially clean condition because of the continuous overflow of such liquid through pipe 150, although filtering means may be provided in receptacle 12 or conduit 108 as desired, in order to remove any foreign materials tending to recirculate within apparatus 10.

As the poultry or other products are discharged from tubular structure 22 through collar 92, the same are deposited upon conveyor mechanism 80 and the flights 102 lift the products out of liquid 104 and direct the same to a desired point above level 106 of liquid 104. In this manner the operation is continuous so long as products are introduced into tubular structure 22 through chute 72 and so long as liquid coolant 104 is maintained at a substantially low predetermined temperature.

After continuous operation it is desirable to intermittently clean receptacle 12 and compartment 82 and this may be easily accomplished by removal of plug 148 normally closing pipe 146 and plug 144 over the end of outlet conduit 142 to thereby drain the liquid 104 from apparatus 10 and permitting the components to be cleaned.

Another important feature of the invention is the provision of tubular sections 24, 26 and 28 presenting tubular structure 22, which are formed of a number of foraminous, segments 30 having a series of perforations 140 therein permitting the water to flow freely through the side wall of tubular structure 22. In this manner the products chilled within receptacle 12 are subjected to the liquid while substantially submerged in the same, but the construction of tubular structure 22 does not in any way damage the poultry. It can be recognized that the vanes 36 projecting outwardly from sections 24, 26 and 28 serve to agitate the liquid 104 within receptacle 12 but do not adversely affect the products being cooled. This agitation of the water in conjunction with continuous agitation and tumbling of the poultry products effects rapid cooling of the articles because of the passage of large quantities of water across the surfaces of the products during advancement of the same, thereby assuring subjection of the birds or other products to liquid at a maximum temperature differential between that of the products and the coolant.

The rate of advancement of the products through tubular structure 22 may be readily controlled by the speed of rotation of shaft 122 and thereby paddles 120 on the same, while the degree of agitation and tumbling of such products may be changed by varying the rate of rotation of tubular structure 22. The rate at which tubular structure 22 should be rotated, as well as the flow rate of the liquid 104 through receptacle 12 and compartment 82, will necessarily vary with individual operating conditions, and those skilled in this art will readily ascertain the correct parameters in order to obtain the required degree of chilling.

Having thus described the invention what is claimed as new and desired to be secured by Letters Patent is:

1. Apparatus for reducing the body temperature of freshly killed birds comprising an elongated receptacle having a liquid inlet at one end thereof and a liquid outlet at its opposite end, and adapted to contain a liquid coolant of sufficient depth to permit the birds to become completely immersed therein; a horizontally disposed liquid passage extending longitudinally of the receptacle and interconnecting the inlet and outlet of the receptacle exteriorly of the latter; means for forcing substantially all of the coolant along a generally horizontal path through the passage toward said inlet to produce a current of said coolant in the receptacle flowing toward the outlet thereof of sufficient volume and speed to serve as the sole force for advancing the birds along the longitudinal length of the receptacle; and an open end, perforated tube mounted for rotation within said current and adapted to receive the birds at one open end thereof for movement by said current to the opposite open end thereof.

2. Apparatus as set forth in claim 1, wherein said tube is provided with a series of vanes extending throughout the length thereof, each disposed transversely radial to the axis of rotation of the tube, and each having a portion extending into the tube and a portion extending outwardly from the tube for tumbling the birds and revolving the coolant.

3. The process of reducing the body temperature of freshly killed birds which consists of maintaining a liquid bath at a depth amply sufficient to cause substantially full immersion of birds introduced thereinto; producing a high volume, unidirectional, generally horizontal, swiftly and continuously flowing current of the entire body of said liquid in the bath; maintaining the temperature of the liquid in the bath appreciably below said body temperature of the birds; releasing the birds into the bath for free movement therein and bodily advancement in a substantially horizontal direction and in sole response to the force of said current of liquid in the bath; maintaining the birds substantially surrounded with the liquid while the same are within the bath; constantly tumbling the birds in the bath as they are advanced, whereby to eliminate quiescence between the liquid and the surfaces of the birds and thereby enhance heat absorption; and removing the carcasses from the liquid when the body temperature thereof has been lowered to a predetermined level.

4. The process of reducing the body temperature of freshly killed birds which consists of maintaining an elongated liquid bath at a depth amply sufficient to cause substantially full immersion of birds introduced thereinto; continuously removing liquid from the bath at one end thereof and continuously directing an equal amount liquid along a generally horizontal path toward and into the bath at the opposite end thereof, whereby to produce a high volume, unidirectional, generally horizontal, swiftly and continuously flowing current of the entire body of said liquid in the bath; maintaining the temperature of the liquid in the bath appreciably below said body temperature of the birds; releasing the birds successively into the bath at said opposite end thereof for free movement therein and bodily advancement to said one end of the bath in a substantially horizontal direction and in sole response to the force of said current of liquid in the bath; maintaining the birds constantly surrounded with the liquid while the same are within the bath; constantly tumbling the birds in the bath as they are advanced, whereby to eliminate quiescence between the liquid and the surfaces of the birds and thereby enhance heat absorption; and removing the birds from the bath adjacent said one end thereof and when the body temperature of the birds has been lowered to a predetermined level.

5. The process of reducing the body temperature of freshly killed birds which consists of maintaining an elongated liquid bath at a depth amply sufficient to cause substantially full immersion of birds introduced thereinto; continuously removing the liquid from the bath at one end thereof, conveying it along a generally horizontal path to the opposite end of the bath and reintroducing it into the bath at said opposite end thereof, whereby to produce a high volume, unidirectional, generally horizontal, swiftly and continuously flowing current of the entire body of said liquid in the bath; maintaining the temperature of the liquid in the bath appreciably below said body temperature of the birds; releasing the birds successively into the bath at said opposite end thereof for free movement therein and bodily advancement to said one end of the bath in substantially horizontal direction and in sole response to the force of said current of liquid in the bath; maintaining the birds constantly surrounded with the liquid while the same are within the bath; constantly tumbling the birds in the bath as they are advanced, whereby to eliminate quiescence between the liquid and the surfaces of the birds and thereby enhance heat absorption; and removing the birds from the bath adjacent said one end thereof and when the body temperature of the birds has been lowered to a predetermined level.

6. The process of reducing the body temperature of freshly killed birds which consists of maintaining an elongated liquid bath at a depth amply sufficient to cause substantially full immersion of birds introduced thereinto; continuously removing the liquid from the bath at one end thereof, conveying it along a generally horizontal path to the opposite end of the bath and reintroducing it into the bath at said opposite end thereof, whereby to produce a high volume, unidirectional, generally horizontal, swiftly and continuously flowing current of the entire body of said liquid in the bath; maintaining the temperature of the liquid in the bath appreciably below said body temperature of the birds; releasing the birds successively into the bath at said opposite end thereof for free movement therein and bodily advancement to said one end of the bath in a substantially horizontal direction and in sole response to the force of said current of liquid in the bath; maintaining the birds constantly surrounded with the liquid while the same are within the bath; constantly tumbling the birds in the bath as they are advanced, whereby to eliminate quiescence between the liquid and the surfaces of the birds and thereby enhance heat absorption; and immediately removing the birds from the liquid as they emerge from said one end of the bath, whereby the liquid being conveyed to said opposite end of the bath is free of birds.

7. The process of reducing the body temperature of freshly killed birds which consists of maintaining an elongated liquid bath at a depth amply sufficient to cause substantially full immersion of birds introduced thereinto; continuously removing the liquid from the bath at one end thereof, conveying it along a generally horizontal path to the opposite end of the bath and reintroducing it into the bath at said opposite end thereof, whereby to produce a high volume, unidirectional, generally horizontal, swiftly and continuously flowing current of the entire body of said liquid in the bath; maintaining the temperature of the liquid in the bath appreciably below said body temperature of the birds; releasing the birds successively into the bath at said opposite end thereof for free movement therein and bodily advancement to said one end of the bath in a substantially horizontal direction and in sole response to the force of said current of liquid in the bath; maintaining the birds constantly surrounded with the liquid while the same are within the bath; continuously moving the liquid transversely of the bath to cause the birds to constantly tumble in the bath as they are advanced, whereby to eliminate quiescence between the liquid and the surfaces of the birds and thereby enhance heat absorption; and immediately removing the birds from the liquid as they emerge from said one end of the bath, whereby the liquid being conveyed to said opposite end of the bath is free of birds.

8. The process of reducing the body temperature of freshly killed birds which consists of maintaining an elongated liquid bath at a depth amply sufficient to cause substantially full immersion of birds introduced thereinto; continuously removing the liquid from the bath at one end thereof, conveying it along a generally horizontal path to the opposite end of the bath and reintroducing it into the bath at said opposite end thereof whereby to produce a high volume, unidirectional, generally horizontal, swiftly and continuously flowing current of the entire body of said liquid in the bath; maintaining the temperature of the liquid in the bath appreciably below said body temperature of the birds; releasing the birds successively into the bath at said opposite end thereof for free movement therein and bodily advancement to said one end of the bath in a substantially horizontal direction and in sole response to the force of said current of liquid in the bath; confining the birds substantially within the medial zone of current movement, whereby to maintain the birds constantly surrounded with the liquid while the same are within the bath; continuously moving the liquid transversely of the bath to cause the birds to constantly tumble in the bath as they are advanced, whereby to eliminate quiescence between the liquid and the surfaces of the birds and thereby enhance heat absorption; and immediately removing the birds from the liquid as they emerge from said one end of the bath, whereby the liquid being conveyed to said opposite end of the bath is free of birds.

9. The process of reducing the body temperature of freshly killed birds which consists of maintaining an elongated liquid bath at a depth amply sufficient to cause substantially full immersion of birds introduced thereinto; continuously removing the liquid from the bath at one end thereof, conveying it along a generally horizontal path to the opposite end of the bath and reintroducing it into the bath at said opposite end thereof, whereby to produce a high volume, unidirectional, generally horizontal, swiftly and continuously flowing current of the entire body of said liquid in the bath; introducing ice into the liquid for free flow therewith into and out of the bath, whereby to maintain the temperature of the liquid in the bath appreciably below said body temperature of the birds; releasing the birds successively into the bath at said opposite end thereof for free movement therein and bodily advancement to said one end of the bath in a substantially horizontal direction and in sole response to the force of said current of liquid in the bath; confining the birds substantially within the medial zone of current movement, whereby to maintain the birds constantly surrounded with the liquid while the same are within the bath; continuously moving the liquid transversely of the bath to cause the birds to constantly tumble in the bath as they are advanced, whereby to eliminate quiescence between the liquid and the surfaces of the birds and thereby enhance heat absorption; and immediately removing the birds from the liquid as they merge from said one end of the bath, whereby the liquid being conveyed to said opposite end of the bath is free of birds.

10. The process of reducing the body temperature of a freshly killed bird which consists of providing a quantity of liquid at a low temperature appreciably below body temperature of the bird; causing the liquid to flow in one direction at a relatively swift rate and along a generally horizontal path of travel; introducing the bird into said moving liquid for conveyance along said path of travel solely by the forward motion of the liquid acting thereon; maintaining the temperature of the liquid substantially at said low temperature; exerting a sufficient force on said swiftly flowing liquid and in a direction generally radial to the axis of the forward motion of the liquid to impart a strong revolving motion to the liquid sufficient to effect tumbling of the bird as the same is advanced along said path whereby quiescence between the bird and the particles which compose the liquid is eliminated and thereby increasing the speed of heat absorption by the liquid as it continuously washes over all of the surfaces of the bird; maintaining the bird in the liquid until the body temperature thereof is lowered to a predetermined level; and removing the bird from the liquid at a point in spaced relationship to the point at which the bird is introduced into the liquid and when the body temperature of the bird has reached said level.

11. The process of reducing the body temperature of a freshly killed bird which consists of providing a quantity of liquid at a low temperature appreciably below said body temperature of the bird and of a depth amply sufficient to permit full immersion of the bird therein; causing the liquid to flow in one direction at a relatively swift rate and along a generally horizontal path of travel; introducing the bird into said moving liquid for conveyance along said path of travel solely by the forward motion of the liquid acting thereon; maintaining the temperature of the liquid substantially at said low temperature; exerting a sufficient force on said swiftly flowing liquid and in a direction generally radial to the axis of the forward motion of the liquid to impart a strong revolving motion to the liquid sufficient to effect tumbling of the bird as the same is advanced along said path whereby quiescence between the bird and the particles which compose the liquid is eliminated and thereby increasing the speed of heat absorption by the liquid as it continuously washes over all of the surfaces of the bird; maintaining the bird in the liquid until the body temperature thereof is lowered to a predetermined level; and removing the bird from the liquid at a point in spaced relationship to the point at which the bird is introduced into the liquid and when the body temperature of the bird has reached said level.

12. The process of reducing the body temperature of a freshly killed bird which consists of providing a quantity of liquid at a low temperature appreciably below said body temperature of the bird and of a depth amply sufficient to permit full immersion of the bird therein; causing the liquid to flow in one direction at a relatively swift rate and along a selected path of travel; introducing the bird into said moving liquid for conveyance along said path of travel solely by the forward motion of the liquid acting thereon; confining said bird within substantially the medial zone of the swiftly flowing liquid adjacent the axis of forward movement thereof while maintaining the bird substantially immersed; maintaining the temperature of the liquid substantially at said low temperature; exerting a sufficient force on said swiftly flowing liquid and in a direction generally radial to the axis of the forward motion of the liquid to impart a strong revolving motion to the liquid sufficient to effect tumbling of the bird as the same is advanced along said path whereby quiescence between the bird and the particles which compose the liquid is eliminated and thereby increasing the speed of heat absorption by the liquid as it continuously washes over all of the surfaces of the bird; maintaining the bird in the liquid until the body temperature thereof is lowered to a predetermined level; and removing the bird from the liquid at a point in spaced relationship to the point at which the bird is introduced into the liquid and when the body temperature of the bird has reached said level.

13. The process of reducing the body temperature of carcasses which consists of producing a high volume, generally unidirectional, generally horizontal, swiftly and continuously flowing current of liquid; maintaining the temperature of said liquid appreciably below said body temperature of the carcasses; releasing the carcasses into the liquid for free movement therein and bodily advancement in a substantially horizontal position and in sole response to the force of said current; revolving the liquid in said current in a direction transversely of the direction of continuous flow to effect tumbling of the carcasses and maintenance of the surfaces of the carcasses in substantially constant contact with the liquid; and removing the cacasses from the liquid when the body temperature thereof has been lowered to a predetermined level.

References Cited in the file of this patent

UNITED STATES PATENTS

| | | |
|---|---|---|
| 2,013,522 | Mills | Sept. 3, 1935 |
| 2,331,855 | Vucossovich | Oct. 12, 1943 |
| 2,649,615 | Sharp | Aug. 25, 1953 |
| 2,825,927 | Lapeyre et al. | Mar. 11, 1958 |
| 2,920,462 | Roser et al. | Jan. 12, 1960 |
| 2,942,429 | Van Dolah et al. | June 28, 1960 |

FOREIGN PATENTS

| | | |
|---|---|---|
| 547,097 | Canada | Oct. 8, 1957 |
| 601,692 | France | Dec. 10, 1925 |